UNITED STATES PATENT OFFICE.

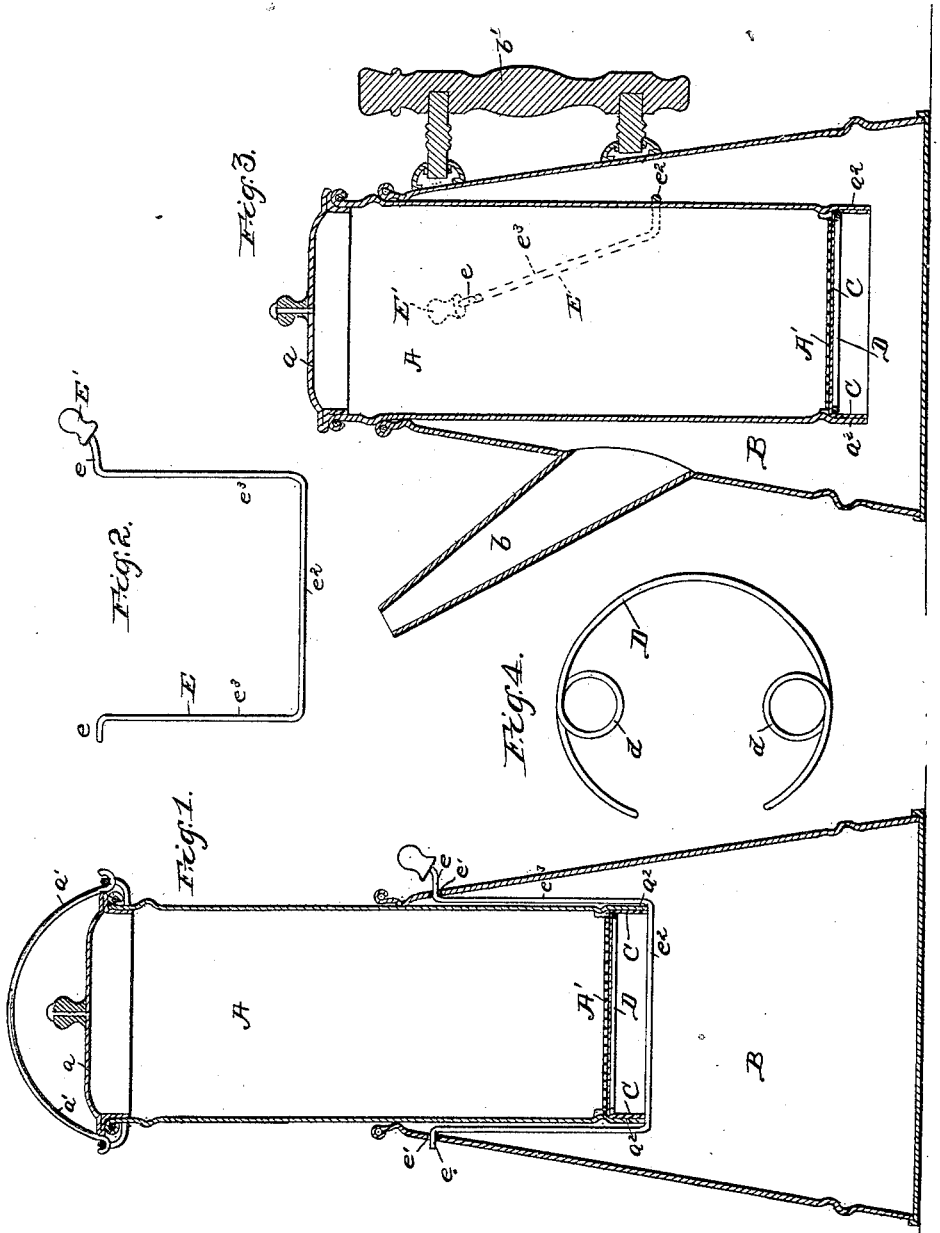

CARY R. MUNGER AND GEORGE H. CORNELL, OF CHICAGO, ILLINOIS.

TWO-PART COFFEE-POT.

SPECIFICATION forming part of Letters Patent No. 424,807, dated April 1, 1890.

Application filed October 7, 1889. Serial No. 326,256. (No model.)

*To all whom it may concern:*

Be it known that we, CARY R. MUNGER and GEORGE H. CORNELL, citizens of the United States, residing at the city of Chicago, in the county of Cook and State of Illinois, have invented certain new and useful Improvements in Two-Part Coffee-Pots, of which the following is a specification.

We are aware that two-part coffee-pots have been heretofore made in which one part of such two-part coffee-pot has been adapted for and used as a receptacle for holding the ground coffee-berry from which coffee is to be made and having perforations in the walls or bottom thereof through which liquid contained therein may pass outward therefrom into the other part of the two-part coffee-pot surrounding such receptacle for such ground coffee-berry and serving as a receptacle for the made or partially made liquid coffee, and from which it is poured as desired. We are aware, also, that in such two-part coffee-pots as heretofore made the part thereof serving as the receptacle for the ground coffee-berries has been at times held above the liquid coffee contained in the other part of such two-part coffee-pot, and that such coffee has been obtained by a process which may be properly termed "leaching" the liquid through the ground coffee-berry by pouring such liquid into the upper receptacle and allowing it to percolate through the ground coffee-berry and pass outward through the perforations in the wall or bottom of the receptacle into the surrounding part of the coffee-pot. In two-part coffee-pots of this description when the coffee thus obtained by the process described is not of sufficient strength such liquid must be poured from the receptacle containing it into a third receptacle and again turned into that part of the two-part coffee-pot holding the ground coffee-berry and again allowed to leach through the same. It has been found in practice that the liquid in passing or percolating through the ground coffee-berry the first time makes courses or ways through the mass of ground coffee-berry, through which courses or ways the liquid passes at each time thereafter when again poured into the receptacle containing such ground coffee-berry, and hence a portion of the ground coffee-berries are not properly brought in contact with the liquid, and may even finally be taken from such receptacle in a perfectly dry condition, never having been wetted in the making of the coffee in such two-part coffee-pot. We are aware, further, that such two-part coffee-pots as heretofore made have at times had the part thereof serving as the receptacle for the ground coffee-berries lowered in the surrounding and other receptacle of such two-part coffee-pot in such manner that the contents thereof have been allowed to remain at all times immersed in the liquid coffee, the ground coffee-berry being in the construction last described separated from the liquid in the surrounding receptacle by the walls of the receptacle in which the ground berry is placed, but a certain amount of flow or interchange of liquid particles from the one to the other of the two receptacles being had in a more or less perfect manner through the perforations in the walls of the receptacle containing the ground coffee-berry.

The purpose of our invention is to obtain a two-part coffee-pot wherein the receptacle for containing the ground coffee-berry may be alternately raised or lowered in the other part of the coffee-pot surrounding it and forming a receptacle for the liquid coffee, whereby the advantages obtained by each of the hereinbefore-described two-part coffee-pots are secured, as well as other and important advantages hereinafter fully set forth.

A further object of our invention is to obtain a simple device whereby a piece of muslin or other textile fabric forming a portion of the perforated wall of the receptacle for containing the ground coffee-berry may be easily and quickly attached in position or removed therefrom.

We have illustrated our invention by the drawings accompanying and forming a part hereof, in which—

Figure 1 is a cross-section of the two-part coffee-pot on a line crossing at right angles the plane in which the spout and handle are placed, and illustrating the part thereof forming a receptacle for the ground coffee-berry placed in the other part of such two-part coffee-pot, so as to be suspended above the liquid coffee which may be contained in the receptacle therefor. Fig. 2 is an elevation of a bent wire adapted to hold the receptacle for holding the ground coffee-berry in the suspended position illustrated in Fig. 1, or to be pressed to one side and allow such receptacle to extend downward to near the bottom of the surrounding receptacle forming the other part of the two-part coffee-pot in the manner illustrated in Fig. 3. Fig. 3 is a cross-section of the two-part coffee-pot upon the plane in which the spout and handle are placed, and illustrating the receptacle for holding the ground coffee-berry in a lowered position, so that the contents thereof may be immersed in the liquid contained in the other part of the two-part coffee-pot and extending therefrom into the part forming the receptacle of the ground coffee-berry through the perforations in the wall or bottom of such receptacle. Fig. 4 is a plan view of a spring for retaining in position muslin or other textile fabric against and upon the under side of the perforated bottom of the receptacle for containing the ground coffee-berry.

Similar letters of reference indicate a part shown in two or more figures.

A is that part of the two-part coffee-pot forming the receptacle for the coffee-berry. $a$ is the cover thereof, and $a'$ the bail.

A' is the perforated bottom of receptacle A, and $a^2$ is an extension of the cylindrical sides of receptacle A below the perforated bottom A'.

B is the part of the two-part coffee-pot into which the receptacle A is inserted and which, surrounding or partially surrounding such receptacle A, forms the receptacle for the liquid coffee obtained by the use of our device.

C is the piece of muslin or other textile fabric hereinbefore referred to as being held firmly against the under side of perforated bottom A' of receptacle A.

B is a coiled-wire spring adapted to hold muslin C in position.

$d\ d$ are coils in spring D, adapted for the insertion of the thumb or fingers, thereby forming a ready means of handling such spring in placing it in position or removing it therefrom.

In order to hold the receptacle A in the elevated position illustrated in Fig. 1, and at the same time to obtain a ready means of releasing such receptacle A from such elevated position, thereby allowing it to be lowered into the receptacle B and in the position illustrated in Fig. 3 of the drawings, we have employed a bent-wire bail E, turning freely on pivotal points $e\ e$ thereof, which are inserted in holes $e'$ in the walls of receptacle B, and having handle E', by which it can be actuated.

$e^2$ is that portion of bent wire E which comes underneath receptacle A when part $e^3$ of bent wire E is in a perpendicular position, or nearly so, and such receptacle A is inserted in receptacle B. By pressing handle E' forward bent wire E rotates partially around on pivotal point $e$, and part $e^2$ of such bent wire E is thereby carried out from under the bottom of receptacle A and into, or nearly so, the position illustrated in Fig. 3, when receptacle A can be lowered into receptacle B, as is illustrated in such Fig. 3.

It is evident that other devices for holding the receptacle A in an elevated position and adapted to be released from contact therewith, thereby allowing such receptacle A to be lowered in receptacle B into about the position illustrated in Fig. 3, may be constructed; but we have found in practice that the herein-described device is extremely simple in design and certain in operation and not liable to get out of order or be injured by the ordinary usage of a two-part coffee-pot.

The operation of this device in the making of coffee is: Ground coffee-berry is placed in receptacle A, and such receptacle is then put in receptacle B and heated liquid poured into receptacle A. Receptacle A being placed in an elevated position, as illustrated in Fig. 1, the liquid contents of receptacle A will percolate through the ground coffee-berry and pass from such receptacle through the perforated bottom A' and muslin C into receptacle B. When all or a greater portion of the liquid contained in receptacle A has thus passed therefrom, handle E' of bent wire E is pressed forward, thereby taking part $e^2$ thereof from under the bottom of receptacle A, and such receptacle A is lowered in receptacle B into about the position illustrated in Fig. 3. An inward flow will then occur into receptacle A of the liquid contained in receptacle B, which inward flow will be maintained until the liquid in the two receptacles is of equal height, or nearly so. Receptacle A is then again elevated into the position illustrated in Fig. 1. These operations are repeated as many times as are required to obtain coffee of the strength required and to fairly exhaust the ground coffee-berry or the essence thereof contained in receptacle A.

One of the great advantages obtained by our device is that any track or way made by the liquid poured into the receptacle A in its passage therefrom through the ground coffee-berry and the perforated bottom A' in the receptacle B is destroyed by the agitation of the particles of the ground coffee-berry, which may be attained by the alternate inflow and outflow of liquid through the perforated bottom A' and the ground coffee-berry, caused by the raising and depressing of receptacle A in the manner described.

In placing the muslin C' in position, such muslin having been preferably cut in the form of a circle as nearly as may be and laid over the bottom of receptacle A, the thumb and finger of one hand are inserted in coil $b\ b$ of spring B and the spring compressed, thereby bringing the two ends of the springs nearer together and lessening the diameter of the large coil thereof, enabling spring D to be inserted in the extended cylindrical sides $a^2$ of receptacle A. The muslin C is thus held firmly against perforated bottom A' by such wire pressing outward against the inner surface of the extended sides $a^2$ of the receptacle A.

Having thus described our invention, what we claim, and desire to secure by Letters Patent, is—

1. In a two-part coffee-pot, the combination of the receptacle A, receptacle B, and adjustable lock E, all substantially as described.

2. In a two-part coffee-pot, a receptacle having a perforated bottom and having cylindrical sides extending beyond such bottom, a wire spring having coils therein adapted for the insertion of the thumb and a finger, and a piece of textile fabric held in position by such spring against the under surface of the perforated bottom, in combination with a second receptacle into which the receptacle having the perforated bottom may be partially inserted, substantially as described.

3. In a two-part coffee-pot, a receptacle having a perforated bottom and having cylindrical sides extending beyond such bottom, a wire spring having coils therein adapted for the insertion of the thumb and a finger, and a piece of textile fabric held in position by such spring against the under surface of the perforated bottom, in combination with a second receptacle into which the receptacle having the perforated bottom may be partially inserted, and a lock in such second receptacle adapted to engage with the first-named receptacle or to be released from such engagement, substantially as described.

CARY R. MUNGER.
GEORGE H. CORNELL.

Witnesses:
CHARLES T. BROWN,
FLORA L. BROWN.